United States Patent [19]

Shannon

[11] 4,364,883
[45] Dec. 21, 1982

[54] CERAMIC PRODUCTS AND METHOD OF DRYING SAME

[75] Inventor: Richard F. Shannon, Lancaster, Ohio

[73] Assignee: Owens-Corning Fiberglas Corporation, Toledo, Ohio

[21] Appl. No.: 205,033

[22] Filed: Nov. 7, 1980

Related U.S. Application Data

[63] Continuation of Ser. No. 32,050, Apr. 23, 1979, abandoned, which is a continuation of Ser. No. 864,186, Dec. 27, 1977, abandoned.

[51] Int. Cl.³ .............................................. C04B 33/36
[52] U.S. Cl. ...................................... 264/60; 264/86; 264/333
[58] Field of Search ...................... 264/60, 63, 86, 333

[56] References Cited

U.S. PATENT DOCUMENTS

| | | | |
|---|---|---|---|
| 2,681,863 | 6/1954 | Croce | 106/109 |
| 3,062,670 | 11/1962 | Marzocchi | 106/99 |
| 3,147,127 | 9/1964 | Shannon | 106/99 |
| 3,289,371 | 12/1966 | Pearson | 52/388 |
| 3,948,673 | 4/1976 | Chase | 106/99 |
| 4,118,236 | 10/1978 | Erskine | 106/71 |
| 4,185,138 | 12/1978 | Graham | 428/391 |
| 4,187,275 | 2/1980 | Bracalielly | 264/511 |
| 4,200,487 | 4/1980 | Bondoc | 162/135 |

*Primary Examiner*—John A. Parrish
*Attorney, Agent, or Firm*—Ronald C. Hudgens; Robert F. Rywalski; William P. Hickey

[57] ABSTRACT

Ceramic products are produced containing a network of glass filaments having a hydrophilic surface. This network of filaments aids the transfer of water from the center of wet ceramic bodies to the surface thereof to speed up dewatering of slip cast materials while in the mold to thereby permit increased production from the molds. In addition, the fibers speed up oven drying of the green ware to give a further increase in production.

5 Claims, 1 Drawing Figure

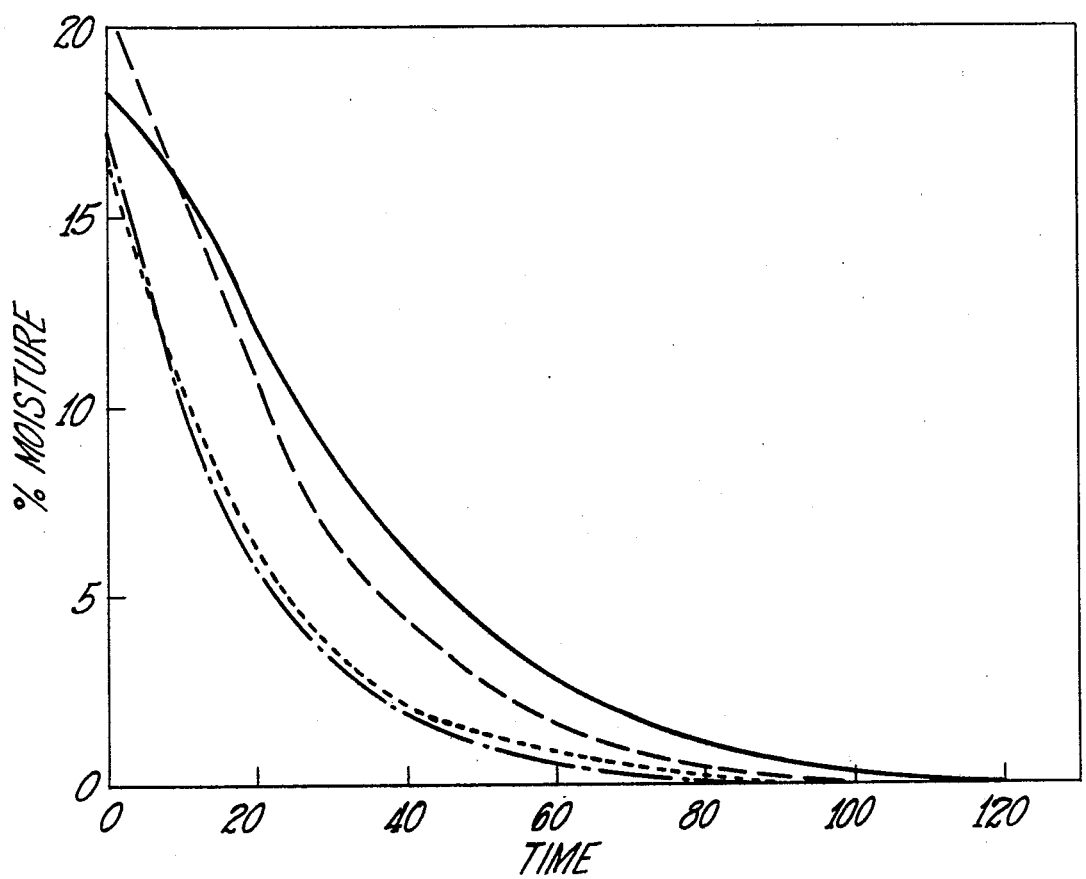

CERAMIC PRODUCTS AND METHOD OF DRYING SAME

This is a continuation of application Ser. No. 32,050, filed Apr. 23, 1979, which in turn is a continuation of application Ser. No. 864,186, filed Dec. 27, 1977, both now abandoned.

The present invention relates to a method of speeding up the drying and improving the strength of ceramic green ware and to green ware formulations having improved strength and which are faster drying.

BACKGROUND OF THE INVENTION

Ceramic products are made from one or more types of clay, alumina or silica. It is a property of powders of such materials that they become plastic and moldable when wetted by water, so that they can easily be made into intricate shapes. In the manufacture of ceramic products, the green ware must be handled while it is in the generally plastic state and before it is dried so that in most instances handleability of the product dictates the minimum thickness from which the article can be made. The molded bodies, commonly called green ware are slowly dried in ovens. Thereafter, they may or may not be coated with a glassy frit and are then fired in kilns to a temperature that fuses the constituents into a hard product. A further condition which affects the minimum thickness from which the ceramic bodies can be made, occurs by reason of slump, sag, or ware distortion during the firing cycle. Slump may occur as phase changes occur within the bodies during the firing cycle.

One object of the invention is to speed up the dewatering of slip cast material on the mold and thereby achieve a faster mold turn-a-round and thus greater production.

Another object of the present invention is the provision of a new and improved method of extracting water from ceramic green ware to shorten the drying time required.

Further objects and advantages of the invention will become apparent to those skilled in the art to which the invention relates from the following description of several preferred embodiments which are described with reference to the accompanying drawings.

DESCRIPTION OF THE DRAWING

The sole FIGURE of the drawing is a graph of the drying time for ceramic greenware, with and without, glass monofilaments of various types.

DESCRIPTION OF THE PREFERRED EMBODIMENTS

In the manufacture of clay ceramic products, various clays may be blended to control the plasticity of the moldable mixture and to incorporate vitrifiable materials such as feldspars, flint, etc. which increase the hardness of the fired product and/or lower its firing temperature. Clays having a high degree of plasticity are subject to greater strains during drying, and are more likely to undergo cracking during drying than are those having a lower degree of plasticity. In addition, clays having a high degree of plasticity distort before or during drying and care must be taken during burning to raise their temperature slowly enough to prevent warping, cracking, or breaking of the ware. During the final stages of firing, vitrification of some of the ingredients weakens the product and sagging may occur; so that in many instances, the shape and thickness of the product is dictated by the strength that is necessary for handleability before firing and to prevent sagging during firing. What has been said about clay ceramic products is also generally true of alumina, and silica ceramics also.

According to principles of the present invention, it has been discovered that water wettable filaments having specific properties in amounts of less than one percent will speed up drying of the ware, will prevent cracking of the ware, and improves dimensional stability of the product during firing.

EXAMPLE 1

This example demonstrates that the inclusion of 0.2% of completely dispersed glass filaments in a clay slip increases the rate at which it dries by at least 15 to 20%. A slip was made from the following materials:

| | |
|---|---|
| Kentucky-Tennessee Ball Clay | 29% |
| Kaolin Clay | 21% |
| Feldspar | 30% |
| Flint (200 mesh) | 20% |

The above materials were mixed with water to give a slurry having a solids content of 72.2%. To this slurry, 0.2% by weight of solids of a filamentizable strand, chopped into ½-inch lengths, was added and the strand was completely broken apart into the individual filaments. The strand comprised 408 E-glass filaments each having a diameter of 0.00036 inch. The individual filaments were coated and held together with 0.6% by weight of a size of the following materials in approximate percentages by weight:

| | |
|---|---|
| Polyvinyl acetate copolymer containing sufficient polyvinyl alcohol groups to make the copolymer water dispersable | 42% |
| Cationic lubricant (Fatty acid tetraethylene pentamine condensate) | 2.2% |
| Glacial acetic acid | 1.75% |
| Ammonium chloride | 1.5% |
| Nonionic wetting agent (Octyl phenoxy polyethoxy ethanol) | 1.6% |

The chopped strands were added to the slurry and agitated until the size on the strands was solubilized to the extent that the strand was completely broken apart into its filaments and the filaments were mixed throughout the slurry.

The slurry was poured into a ¾-inch diameter by 6-inch long cavity the half portions of which were formed in 6-inch, by 6-inch, by 10-inch gypsum blocks that were clamped together to form a slip cast mold. The slurry was poured into this mold until the solids were level with the top thereof, and the mold was let stand for approximately 5 hours. Thereafter, the half sections of the mold was separated, and a slip cast rod ¾-inch in diameter was removed therefrom. A total of 20 such rods were made and placed into an oven maintained at a temperature of 221° F. Thereafter, at intervals of 10 minutes, one of the rods was removed and weighed, and the weight loss was plotted to give the weight loss curve shown in FIG. 1 of the drawings.

EXAMPLE 2

The process of Example 1 was repeated excepting that no glass was added and the weight loss curve of this product is also shown in FIG. 1.

EXAMPLE 3

The process of Example 1 was repeated excepting that the strand used was soaked in a silicone solution obtained from the Dow-Corning Corporation and which carried their designation DC-200. The coated strand was baked to make them water repellent. The drying rate for the slip cast rods containing the silicone treated filaments is substantially identical with the curve of Example 2, and which was devoid of fibers.

EXAMPLE 4

The process of Example 1 was repeated excepting that the strand of Example 1 was replaced by the same amount of ½-inch lengths of a strand sized to give high strand integrity and which comprised the following materials:

| Material | Percent by Weight |
| --- | --- |
| Water soluble epoxy | 15.75 |
| Polyvinyl acetate, N—methylolacrylamide copolymer | 36.7 |
| Vinyl acetate ethylene copolymer emulsified particles stabilized with acetylated polyvinyl alcohol | 36.7 |
| Gamma-methacryloxypropyl-trimethoxysilane | .95 |
| Glacial acetic acid | 2.85 |
| Carbowax | .95 |
| Lubricant | 2.85 |
| Paintable fluid silicone emulsion | 4.75 |

The drying rate for this material is also plotted in FIG. 1. It will be seen that the filamentizable strand of Example 1 dries at least 15% faster than does the material which did not filamentize.

EXAMPLE 5

The process of Example 1 is repeated excepting that the amount of chopped strand was increased to 1%. Its drying rate is tabulated following Example 6.

EXAMPLE 6

The process of Example 1 was repeated excepting that the strand was chopped into 1-inch lengths, and a half percent was used instead of the amount given in Example 1. The drying rate for this material is also tabulated below.

| Time (minutes) | Percent Moisture Example 5 | Percent Moisture Example 6 |
| --- | --- | --- |
| 0 | 17.2 | 16.6 |
| 10 | 10.1 | 10.4 |
| 20 | 5.0 | 6.2 |
| 30 | 3.6 | 3.8 |
| 40 | 2.0 | 1.9 |
| 50 | 0.8 | 1.5 |
| 60 | 0.5 | 0.8 |
| 70 | 0.4 | 0.6 |
| 80 | 0.2 | 0.4 |
| 85 | 0.0 | 0.0 |

Tests have been made adding various percentages of from 3% to 8% by weight of solids of ½-inch lengths of strand which does not filamentize in slip forming materials. In all cases, the samples had many times more drying cracks and much more sagging than did the materials of Example 1. It will be seen that 3% is 15 times the amount of strand than was used in Example 1 above, and that 8% is 40 times more strand than was used in Example 1 above. Since completely filamentizable strand disintegrates into the individual filaments or bodies, the number of filaments provided in Example 1 is ten times the number of bodies provided by 8% strand. Size materials that give high strand integrity are not loosened by water and mixing action to expose the glass surface. Glass, of course, is highly wettable. Sizes that are not deteriorated by water are not as hydrophilic as are materials that are wetted by water. It now appears that the filaments of the present invention form a three dimensional network of highly wettable surface, the filaments of which criss-cross each other to move the water from the center of the green ware to the external surface from which the water evaporates. It is not believed that the filaments need actually touch each other, although this may be desirable, since water may transfer much more easily from one filament to another through a narrow layer of the green ware material than it can travel the entire distance through the green ware. The filaments are, of course, solid bodies so that it is surprising that they would aid elimination of water from material that closely surrounds the filaments. Glass, however, has peculiar properties in that it has a great affinity for water and water wets glass with an angle of contact that approaches zero. It is believed that water spreads along the surface of the glass even in very thin layers, and that these layers may exist even beneath particles of clay or other material packed tightly against the fibers; so that the fibers will aid the drying of bodies even though the fibers have no porosity. This drying effect is surprising and can significantly decrease the drying time of ceramic bodies. In addition, the fibers hold the green ware together to prevent distortion before firing and sagging during firing. Thinner sections have less weight and require less energy for firing, so that 1% or less of glass filaments can considerably reduce the amount of energy that is required to produce clay flatware, sanitary ware, tile, brick, or any other ceramic body. As little as 0.05% of filamentizable glass strand will produce a noticeable affect, and 1% of ½" long filaments will be approximately the maximum that can be completely dispersed throughout the slurry without balling. The preferred range will be between 0.05% and 0.5% by weight based on solids, and will vary somewhat with fiber diameter and density of the ceramic material. For fiber of 0.00036 inch in diameter, this corresponds to from 3,375 to 33,750 inches of filaments per cubic inch of product. The filaments will preferably have a length between 3/16 and 1 inch, and preferably will be approximately ½ inch in length.

Glass strand that is devoid of coatings of any type would perhaps be a preferred material provided that it could be produced commercially, stored without being poisoned by picking up oils and greases from the air, and be chopped successfully. The art, however, has always found it necessary to add some type of coating so that the filaments will be separated to prevent mutual abrasion and can be pulled continuously without breaking. In commercial coatings, an organosilane is used to provide such a lubricity. These silanes tend to be attracted to the surface of the glass and usually contain hydrophobic materials which reduce the wettability of the filaments. In most instances, commercial coatings will also include organic polymers which further decrease the wettability of the filaments. In general, such commercial strand is not dispersible in water. Other materials that are used commercially to coat the filaments are starches that contain vegetable oils that are emulsified by nonionic emulsifiers. Regardless of the materials used, a suitable criterion for determining the suitability of the strand for the drying purposes of the present invention is whether or not the coatings are dispersible in water and are substantially devoid of organosilanes and lubricants which stick to the surface of the glass.

Although the previous examples relate to the drying of cast ware, it is not so limited. The filaments will also have benefit in the drying of extruded ceramic ware.

EXAMPLE 7

An extruded ceramic product is made from the following formulation:

| Ball clay | 35% by weight |
|-----------|---------------|
| Talc      | 65% by weight |

These materials are pug milled with a small amount of water to give a solids content of 92% by weight and are extruded from the pug mill as cylindrical rod. The rod is cut into lengths and are dried. When 0.2% by weight of solids of ½-inch chopped strand of the same type as used in Example 1 is dispersed throughout the clay, substantially the same improvement in drying, green strength, and resistance to sagging during firing is experienced as occurs in the slip cast products described above.

The following is a table which gives the number of ½-inch long, 0.00050 inch diameter filaments per cubic inch of product, a product having a density of 1.85.

| Percent By Weight | Inches of filament per cubic inch of product |
|-------------------|----------------------------------------------|
| 0.01              | 360                                          |
| 0.05              | 1,800                                        |
| 0.2               | 7,300                                        |
| 0.5               | 18,200                                       |

The same percentages of filaments having a diameter of 0.00025 inch will be approximately four times greater. The broad range, therefore, will be between 300 and 150,000 inches of filament per cubic inch of product. The network of filaments that is utilized in the method and materials of the present invention must be formed by substantially completely filamentized strand since strand that is not filamentized has voids between the filaments which attract and hold water. On the other hand, individual filaments retain only a very thin layer of water, perhaps several molecules thick, and this water spreads almost indefinitely along its surface since the angle of wetting on nascent glass approaches zero. Since this is necessary, the surface of the individual filaments must not be substantially poisoned by silicones, organic polymers, oils or other nonwetting materials. It is known that nascent glass filaments in water have identical negative charges which repel each other, and this phenomenon is believed utilized to disperse the individual filaments into the three dimensional criss-crossing filament network that is necessary to pass through or adjacent all interstitial voids of the ceramic green ware benefited by the present invention. The filaments used in the present invention, in an aqueous media develop a zeta potential of mutually repelling negative charges on the individual filaments which causes them to repell each other and spread throughout ionically neutral or similarly charged clay particles. If the ceramic particles should be positively charged, it is possible to treat the glass filaments with acid and/or counter ions such as di or trivalent positive ions as for example aluminum sulfate, or alum, to spread the glass filaments throughout the positively charged particles.

Tile, brick, and sewer pipe all are made by the extrusion or pressing of slightly damp mixtures of material, and all benefit appreciably by the monofilament network of the present invention.

While the invention has been described in considerable detail, I do not wish to be limited to the particular embodiments shown and described; and it is my intention to cover hereby all novel adaptations, modifications and arrangements thereof which come within the practice of those skilled in the art to which the invention relates, and which come within the purview of the following claims.

I claim:

1. A method of producing clay, alumina or silica base ceramic products, comprising: adding chopped strand of mineral filaments having a hydrophilic surface into a green ware forming formulation that includes water, said filaments being bonded together into the strand by binder that is sufficiently water soluble that the strand is completely filamentizable when agitated in water; mixing the strand and formulation together under conditions which break the strand apart into individual monofilaments and disperse the monofilaments throughout the green ware forming formulation to give a three dimensional network of from 300 to 150,000 inches of filament per cubic inch; molding the mixture to form green ware under conditions preserving said three dimensional network; drying the green ware under conditions allowing the filaments to aid in moving water from the interior of the green ware to its surface; and firing the products above a temperature which fuses the green ware into a hard ceramic product.

2. The method of claim 1 wherein the monofilaments comprise from 0.05% to 0.5% by weight of the mixture solids.

3. The method of claim 2 wherein the monofilaments are glass fibers.

4. The method of claim 3 wherein the monofilaments have a length between ¼ and 1 inch.

5. A method of producing dried and fired clay, alumina or silica base products, comprising: adding chopped strand of mineral filaments having a hydrophilic surface into a green ware forming formulation that includes water, said filaments being bonded together into the strand by binder that is sufficiently water soluble that the strand is completely filamentizable when agitated in water; mixing the strand and formulation together under conditions which break the strand apart into individual monofilaments and disperse the monofilaments throughout the green ware forming formulation to give a three dimensional network of from 300 to 150,000 inches of monofilaments per cubic inch; molding the mixture to form green ware under conditions preserving said three dimensional network; drying the green ware under conditions allowing the filaments to aid in moving water from the interior of the green ware to its surface; and firing the green ware at a sufficiently elevated temperature to produce a hard fired product.

* * * * *